No. 632,308. Patented Sept. 5, 1899.
J. FIRSCHING.
MACHINE FOR CUTTING AND TURNING WRISTBANDS.
(Application filed Apr. 27, 1899.)

(No Model.) 3 Sheets—Sheet 1.

WITNESSES.
Rich. A. George
C. Herbert Wilson

INVENTOR
JOSEPH FIRSCHING
By Milton E. Robinson
ATTORNEY.

No. 632,308. Patented Sept. 5, 1899.
J. FIRSCHING.
MACHINE FOR CUTTING AND TURNING WRISTBANDS.
(Application filed Apr. 27, 1899.)
(No Model.) 3 Sheets—Sheet 2.
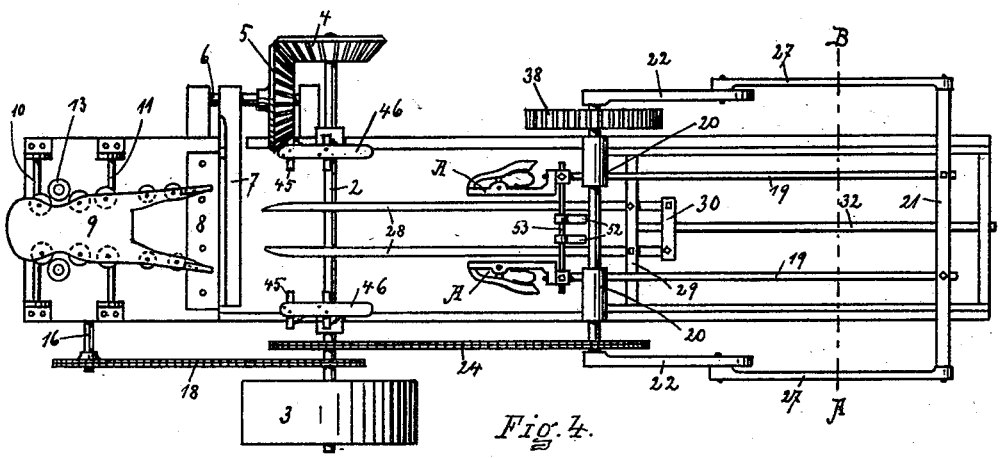
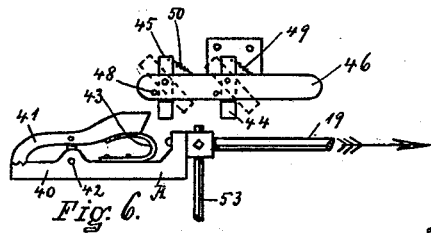
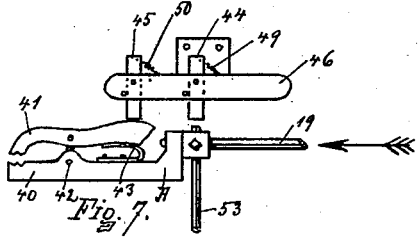
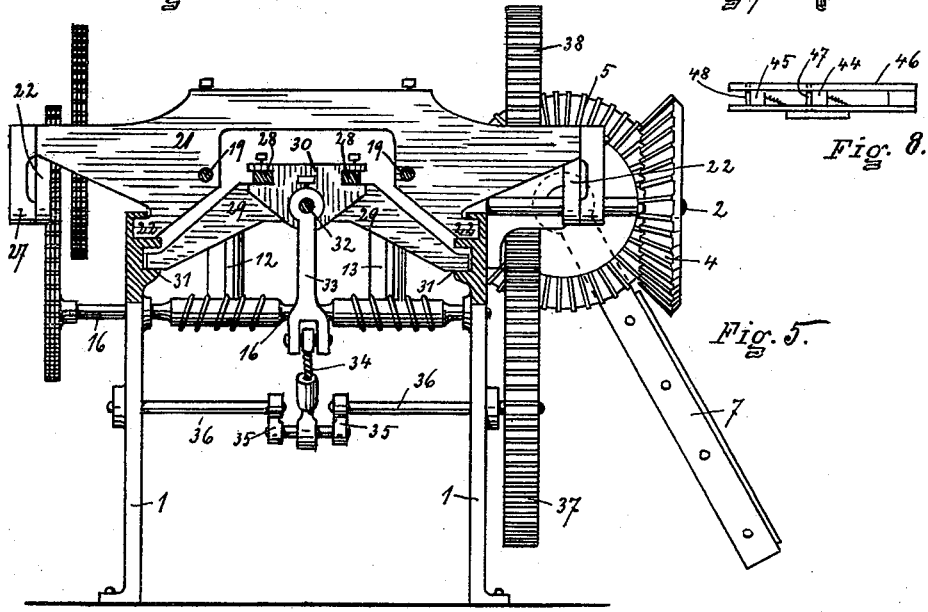
WITNESSES.
Rich: A. George.
C Herbert Wilson.
INVENTOR
JOSEPH FIRSCHING.
By Milton E. Robinson
ATTORNEY.

No. 632,308. Patented Sept. 5, 1899.
J. FIRSCHING.
MACHINE FOR CUTTING AND TURNING WRISTBANDS.
(Application filed Apr. 27, 1899.)
(No Model.) 3 Sheets—Sheet 3.
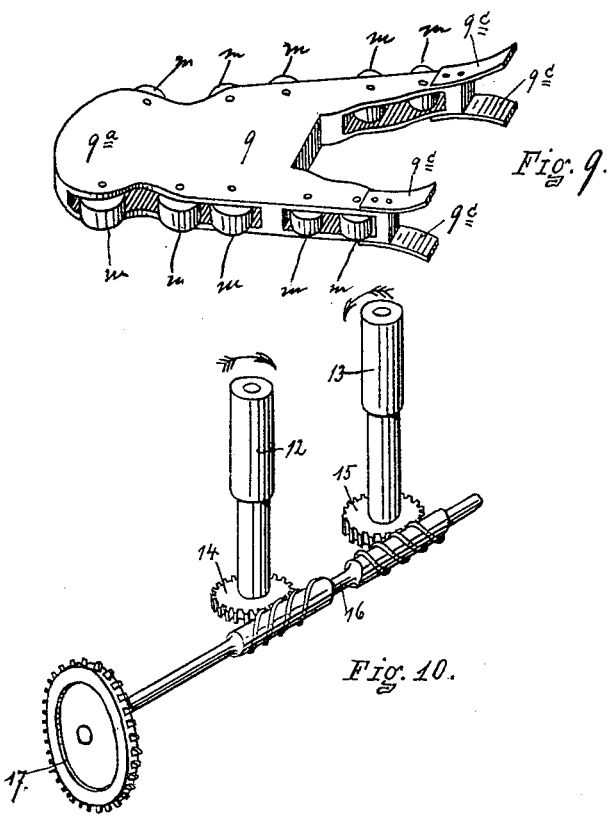
WITNESSES.
Rich. A. George
C. Herbert Wilson
INVENTOR
JOSEPH FIRSCHING
By Milton E. Robinson
ATTORNEY.

UNITED STATES PATENT OFFICE.

JOSEPH FIRSCHING, OF UTICA, NEW YORK.

MACHINE FOR CUTTING AND TURNING WRISTBANDS.

SPECIFICATION forming part of Letters Patent No. 632,308, dated September 5, 1899.

Application filed April 27, 1899. Serial No. 714,679. (No model.)

*To all whom it may concern:*

Be it known that I, JOSEPH FIRSCHING, of Utica, in the county of Oneida and State of New York, have invented certain new and useful Improvements in Machines for Cutting and Turning Wristbands; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

The object of my present invention is to provide a machine for cutting off and partially turning tubular knit fabrics, such as are used for cuffs and wristbands of undergarments.

Figure 1:
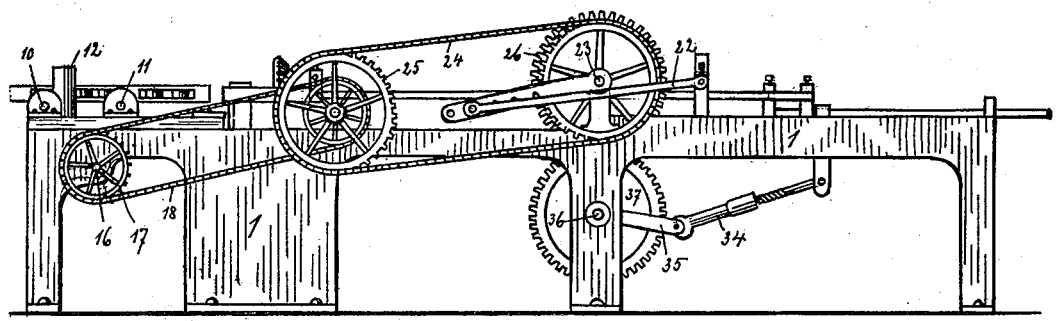
Figure 2:
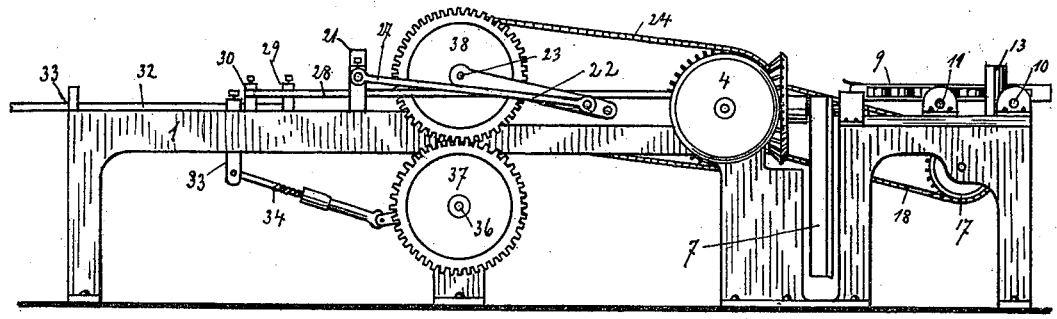
Figure 3:
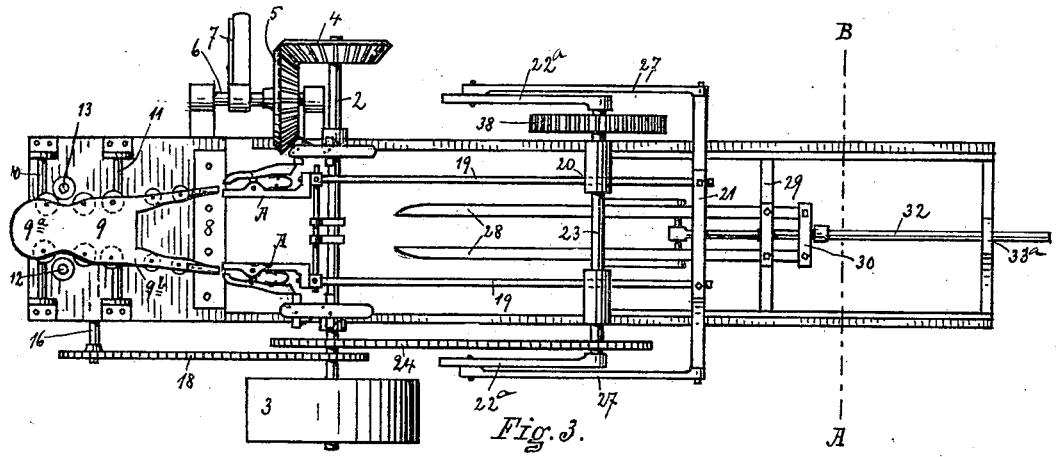

In the drawings, Figure 1 shows a side elevation of the machine. Fig. 2 shows the opposite side from that shown in Fig. 1. Fig. 3 shows a plan with the operative parts substantially at one of their limits of movement. Fig. 4 shows a similar plan with the operative parts substantially at the other limit of their movement from that shown in Fig. 3. Fig. 5 shows an enlarged section taken on line A B of Fig. 3, together with the parts to the left of the section-line. Figs. 6, 7, and 8 show details of grippers and gripper-operating mechanism employed in the machine. Fig. 9 shows in perspective a fabric-expander employed in the machine. Fig. 10 shows in perspective, removed from the machine, a pair of feed-rollers and their operating mechanism.

Referring to the letters and figures of reference in a more particular description, 1 indicates the frame of the machine, on which the working parts are supported. Mounted in bearings in the upper part of the machine is the main shaft 2, which may be provided with the driving-pulley 3. The shaft 2 also carries a beveled gear-pinion 4, which meshes with a similar pinion 5, mounted on a short longitudinal shaft 6, also carried in suitable bearings on the frame. The shaft 6 carries the knife 7, which while operating shears by the shearing-plate 8, secured on the top of the frame. The fabric-expander 9 is arranged to take a position at the left of the shearing-plate 8, as the machine is shown in Fig. 3, and is supported on a pair of bars or small rollers 10 and 11. The expander or extender 9 has a head portion $9^a$ and divergent edges $9^b$, and there is arranged along the edges a series of small rollers $m\ m$ to reduce the friction of the tubular fabric. At the ends of the diverging edges $9^b$ there are provided pairs of divergent spring-arms $9^c\ 9^c$, adapted to extend or open up the end of the tubular fabric vertically. The expander or extender 9 is adapted to take its position between the vertical rollers 12 and 13 in the frame—that is to say, the neck portion of the expander is adapted to enter between these two vertical rollers. The expander is thus confined from movement to any material extent in either direction. The rollers 12 and 13, which are mounted in suitable bearings in the frame, are provided at the lower end of the shaft on which they are mounted with gear-pinions 14 and 15, respectively, engaged by the right and left hand worms on the shaft 16. The shaft 16 is provided with a sprocket-wheel 17 and is driven from the shaft 2 by a sprocket-chain 18.

For drawing and manipulating the fabric there is provided a pair of grippers A A. These grippers are mounted on the ends of a pair of reciprocating arms 19 19. The arms 19 slide freely through eyes at 20 in the frame and are secured in the sliding head 21. The sliding head 21 is provided with projections 22, which run in grooves or ways on the inner side of the upper edge of the frame 1. For operating the grippers there is provided a pair of cranks $22^a\ 22^a$, mounted on opposite ends of the shaft 23, which shaft is mounted in suitable bearings in the upper side of the frame. The shaft 23 is driven from the shaft 2 by a sprocket-chain 24, passing around the sprocket-wheels 25 and 26, secured on the shafts 2 and 23, respectively. The cranks $22^a$ are connected with the projecting ends of the head 21 by connecting-rods 27 27. By this arrangement as the shaft 23 is driven the cross-head 21 is moved backward and forward in its ways on the frame, and with it the grippers A A are carried backward and forward, being carefully guided and directed by passing through the eyes 20.

There are also provided in the machine a pair of supporting and turning fingers 28 28.

These fingers are secured in a sliding crosshead 29 and the holding-block 30. The crosshead 29 is provided with projections which engage in the grooves or ways 31 on the inner side of the frame and slide freely therein. Secured in the cross-head 29 and the holding-block 30 is a rod 32, which extends to and freely slides through an eye at 33ª in the rear end of the frame. Rigidly secured on the rod 32 is an arm 33, which projects downwardly and is connected at its lower end with a connecting-rod 34. The connecting-rod 34 connects the arm 30 with a crank 35, formed in the shaft 36. The shaft 36 is driven by the intermeshing cog-pinions 37 and 38, secured on the shafts 36 and 23, respectively.

The grippers A consist of a fixed jaw 40 and a movable jaw 41, pivoted together at 42 and held in closed position by the spring 43. For operating the movable jaw 41 there is secured on the frame for each jaw a pair of trippers 44 and 45. These trippers are blocks pivoted at their middle in the supporting-plate 46, so as to swing freely in one direction, but being limited in their movement by pins 47 and 48, respectively. When not otherwise displaced or interfered with, the tripping-blocks 44 and 45 are held in their normal position crosswise of the plates 46 by the springs 49 and 50, respectively. It will thus be noted that when the grippers A are moving in the direction indicated by the arrow in Fig. 7 the shank portion of the movable jaw meets with positive resistance from the trippers 44 and 45, and as the grippers are forced by the trippers the trippers operate over the cam-face back of the movable jaw 41, so as to open the jaw, while, however, when the grippers are moved in the opposite direction—that is to say, in the direction indicated by the arrow in Fig. 6—the end of the movable jaw 41 strikes against the sides of the trippers, respectively, and they are swung on their pivots, as indicated by dotted lines in Fig. 6, and the jaw 41 is not operated, so that it will not lose hold of the fabric when moving in this direction.

The operation of the machine is substantially as follows: A tubular fabric of the proper size is supplied to the machine at the left-hand end, as shown in Figs. 1 and 2, either from a reel or roll or otherwise. The expander or extender 9 is removed from the machine and inserted in the end of the tubular fabric, when the same is replaced in the machine in the position indicated in the drawings. The machine being in proper position—that is to say, substantially that shown in Fig. 3—the end of the tubular fabric is carried slightly beyond the extender 9 and engages with the grippers A A. The machine is then started. The operation is then, first, for the grippers A to pass toward the right, as the machine is shown in Fig. 3, drawing the fabric after them over the extender 9. At the time of this operation the rollers 12 and 13 are being driven and assist the fabric in passing the extender; also, at the time that the grippers A are drawing the fabric over the expander the fingers 28 28 are being moved toward the left from the position shown in Fig. 3 and pass within the tubular fabric, which is being brought forward by the grippers A A. The arrangement of the parts is such that when the grippers have completed their movement in one direction and the fingers 28 their movement in the opposite direction and the parts are substantially in the position shown in Fig. 4 the swinging knife 7 has completed its revolution around with the shaft 6 from the cutting-plate 8 and now comes into operation to sever the fabric at the edge of the cutting-plate 8. The continued operation of the machine then carries the grippers A toward the left as the machine is shown in Figs. 4 and 3. It may be here noted that the outer sides of the fingers 28 are preferably roughened similar to a file or rasp. As the grippers A move toward the left, as shown in Fig. 4, the fabric is turned inside out on the fingers 28, these fingers at the same time being retracted or carried toward the right. The arrangement of the parts is such that at the time that the rear end of the jaw 41 comes in contact with the tripper 44 the turning operation will be completed, and the grippers will then be released by the operation of the tripper 44, releasing the edge of the fabric. In the continued operation of the machine the piece of partially or half turned fabric is forced off from the end of the fingers 28 by the dependent hooks 52 52, carried by the cross-bar 53, extending between the grippers A. At the same time the movable jaw of the gripper comes into contact with the tripper 45 and is held open until the fixed jaw 40 enters the open end of the tubular fabric held by the extender 9, when the jaw is released and the gripper has again secured hold of the end of the web of the fabric, and the continued operation of the machine repeats the operation heretofore described. The partially-turned pieces of fabric which are forced off from the end of the fingers 28 fall into the lower portion of the machine, where they may be caught in a receptacle or basket placed for that purpose.

All parts of the machine are preferably made adjustable, whereby the machine is adapted to various sizes of material, and the several movements of parts may be timed to a nicety. The cutting mechanism and other parts might be modified in many particulars without departing from the spirit of my invention.

What I claim as new, and desire to secure by Letters Patent, is—

1. In a machine for turning and cutting tubular fabric, an expander passing through the tubular fabric an internal supporter movable toward and from the expander, a fabric-manipulator movable toward and from the expander and a cutting mechanism arranged adjacent to the delivery end of the expander, combined, substantially as set forth.

2. In a machine for cutting and turning tubular fabrics, a fabric-tube expander, an internal supporter movable toward and from the expander and arranged to support a section of the tubular fabric, a fabric-manipulator movable toward and from the expander, having means for gripping the end of the tube, and a cutting-off mechanism arranged adjacent to the delivery end of the expander, combined, substantially as set forth.

3. In a machine for turning and cutting tubular fabrics, the fabric-tube expander and fabric-manipulating mechanism operating toward and from the expander and having means for gripping the end of the fabric, an internal fabric-supporter and a cutting mechanism, combined, substantially as set forth.

4. In a machine of the character described, a fabric-expander arranged to expand the fabric tube in a flattened form, a fabric-manipulating mechanism operating toward and from the expander and having means for engaging the end of the fabric tube at the expander and a cutting mechanism arranged adjacent to the expander, substantially as set forth.

5. In a machine of the character described, an expander, a reciprocating fabric-manipulator having means for and arranged to engage the opened end of the fabric tube at the expander, an internal fabric-supporter arranged to support the section of fabric tube which has passed the expander, and a cutting mechanism, combined, substantially as set forth.

6. In a machine of the character described, a fabric-expander formed to deliver the fabric in an opened, flattened, tubular form, reciprocating internal supporting-fingers movable toward and from the expander, a reciprocating fabric-manipulator arranged to draw and turn the fabric and a cutting mechanism arranged at the delivery end of the expander, combined, substantially as set forth.

7. In a machine of the character described, a fabric-expander, a fabric-drawing mechanism having means for gripping the end of the tubular fabric and movable toward and from the expander and a cutting mechanism located at the delivery end of the expander, combined, substantially as set forth.

8. The combination in a machine of the character described, of a tubular fabric-expander, a drawing mechanism operating toward and from the expander, a fabric holder or supporter adapted to pass within the section of tubular fabric which has passed the expander, and a cutting-off mechanism arranged adjacent to the delivery end of the expander, substantially as set forth.

9. In a machine for operating on tubular fabric, the combination of an expander adapted to pass through the tubular fabric and having depressions in its side, of external rollers adapted to take position in said depressions and maintain the position of the expander, substantially as set forth.

10. In a machine of the character described, a tubular-fabric expander having divergent sides with depressions therein, and rollers arranged along the sides, in combination with a pair of fixed rollers adapted to take position in said depressions and maintain the position of the expander, substantially as set forth.

11. The combination in a machine of the character described, of the expander 9, the rollers for maintaining the position of the expander, the cutting mechanism arranged approximate to the delivery end of the expander, the grippers A and mechanism for operating the same, the fingers 28 and mechanism for operating the same, substantially as set forth.

In witness whereof I have affixed my signature, in presence of two witnesses, this 21st day of April, 1899.

JOSEPH FIRSCHING.

Witnesses:
ANDREW FIRSCHING,
SARAH A. BROWN.